United States Patent [19]

Kawauchi et al.

[11] Patent Number: 4,820,909

[45] Date of Patent: Apr. 11, 1989

[54] TRANSACTING DEVICE

[75] Inventors: Masataka Kawauchi, Ishioka; Mitsuyoshi Sato, Ibaraki; Tamio Innami, Tsuchiura; Takeshi Katoh, Ibaraki, all of Japan

[73] Assignee: Hitachi, Ltd., Tokyo, Japan

[21] Appl. No.: 57,253

[22] Filed: Jun. 3, 1987

[30] Foreign Application Priority Data

Jun. 4, 1986 [JP] Japan .............................. 61-127955
Jun. 4, 1986 [JP] Japan .............................. 61-127953

[51] Int. Cl.$^4$ .............................. G06F 15/30
[52] U.S. Cl. .............................. 235/379; 902/12
[58] Field of Search .............................. 235/379; 209/534; 902/12

[56] References Cited

U.S. PATENT DOCUMENTS 4,479,049 10/1984 Hirose .............................. 235/379

FOREIGN PATENT DOCUMENTS 59-20685 11/1984 Japan .

*Primary Examiner*—Harold I. Pitts
*Attorney, Agent, or Firm*—Antonelli, Terry & Wands

[57] ABSTRACT

A transacting device performs its transacting operations in response to a customer's request for a deposit or payment transaction. Upon the request for the deposit transaction, paper currencies deposited through a money receiving/paying port are transferred en bloc by paper currency transferring means to an accumulation unit close to a separating unit. The currencies are individually separated by the separating unit and then identified by an identifying unit with respect to authenticity, monetary classification and the number of currencies. Thereafter, the currencies are accumulated in a plurality of accumulation units according to the monetary classification. When making the request for the payment transaction, a plurality of the currencies accumulated in the accumulation units are transferred en bloc by the transferring means to the accumulation unit vicinal to the separating unit. The currencies are separated piece by piece by the separating unit and identified by the identifying unit with respect to the authenticity monetary classification and the number of currencies. The identified currencies are accumulated in another accumulation unit. After the currencies whose species and number are specified by the customer have been accumulated in this accumulation unit, the currencies are transferred en bloc by the transferring means to the money receiving/paying port, whereby the currencies are handed over to the customer.

27 Claims, 19 Drawing Sheets

TRANSACTING DEVICE

BACKGROUND OF THE INVENTION

1. Field of the Invention

The present invention relates to a transacting device, and more particularly, to a device suitable for use as a cash transacting device which deals with deposit and payment of paper currencies.

2. Description of the Prior Art

In recent years, there has been proposed a cash dealing device of a so-called circulation type wherein the deposit paper currencies serve as payment paper currencies to improve capital efficiency. The cash dealing device, as is disclosed in the specification of U.S. Pat. No. 4,479,049, has its cash-inlet provided with a separating mechanism designed for counting the number of the paper currencies by separating the currencies respectively; on its downstream-side are provided a collecting/separating mechanism for collecting and separating ten thousand yen notes and thousand yen notes for payment and another collecting/separating mechanism for accumulating five thousand yen notes and damaged paper currencies; and the separating mechanism and the collecting/separating mechanisms cooperate to function, whereby the deposit currencies can be employed for payment in circulation. In this case, the separating mechanism and the collecting/separating mechanisms are demanded for such high reliability that the paper currencies under any kind of conditions can precisely separated and collected without undergoing a jammed state. In such a constitution, on the occasion of dealing with the deposit and payment the currencies are separated piece by piece and are then carried by carrying means like a belt. For this reason, when a good number transactions are concentrated, the customers have to wait for a long time.

On the other hand, stacked bill conveyance in which a manipulator is utilized for partially carrying the media to be processed such as paper currencies is exemplified in the specification of Japanese Patent Laid-Open No. 208685/1984. Such is the arrangement that the cash, bankbooks, cash cards are transferred by the manipulator between a plurality of customer operation panels and appliances such as a cash card reading mechanism, a bankbook printing mechanism, a money receiving mechanism. When the deposit and the payment are effected, the manipulator moves between a plurality of the customer operation panels and, for instance, the money receiving mechanism or a money paying mechanism. Such being the case, when the transactions are concentrated, some customer operation panels are disadvantageously incapable of depositing or drawing out the money till the manipulator comes.

SUMMARY OF THE INVENTION

It is a primary object of the Invention to provide a transacting device capable of reducing a time for which the money is deposited or drawn out.

To this end, according to one aspect of the invention, there is provided a separating mechanism suitable for diminishing a time required for the transaction.

The transacting device according to the present invention comprises: an accumulation unit for receiving at least deposit paper currencies and accumulating these currencies; another accumulation unit, enterable in the deposit currency accumulation unit, for accumulating the currencies of a first group; a separating unit, disposed in the vicinity of an accumulation unit for accumulating payment currencies of the first group as well as in the vicinity of the deposit currency accumulation unit, for selectively separating and carrying the currencies accumulated in these accumulation units; an identifying unit for identifying the separated paper currencies with respect to their authenticity, classification and the number of currencies; an accumulation unit for accumulating the currencies which are to be returned to the customer and/or the payment currencies; an accommodation unit for accommodating the deposit currencies and/or the payment currencies; and paper currency transferring means for transferring a multiplicity of paper currencies by grasping them en bloc between the accumulation units, the accommodation unit and a money receiving/paying port.

In the case of depositing the money, the paper currencies deposited through the money receiving/paying port are seized by the paper currency transferring means and are then accumulated in the deposit currency accumulation unit. The deposit currencies accumulated in the accumulation unit are separated piece by piece by means of the separating unit and are then carried by carrying means to the identifying unit. The paper currencies identified by the identifying unit are carried by the carrying means and are accumulated in the accumulation unit appropriate for returning and/or paying the money to the customer. After an amount of the paper currencies counted by the identifying unit has been confirmed by the customer, the currencies are carried to a predetermined position, thus completing the deposit transaction. In the case of payment of the paper currencies, a proper amount of payment currencies of at least the first group are grasped and taken out of the accommodation unit constituting a cash box by the paper currency transferring means and are accumulated in the payment currency accumulation unit. The currencies accumulated in this accumulation unit which is made to move and enter the deposit currency accumulation unit are separated by the separating unit. After counting the number of the paper currencies specified by the customer with the aid of the identifying unit, the currencies are transferred to the money receiving/paying port, and the customer receives the paper currencies, thereby finishing the payment transaction.

DESCRIPTION OF THE PREFERRED EMBODIMENTS

Figure 1:
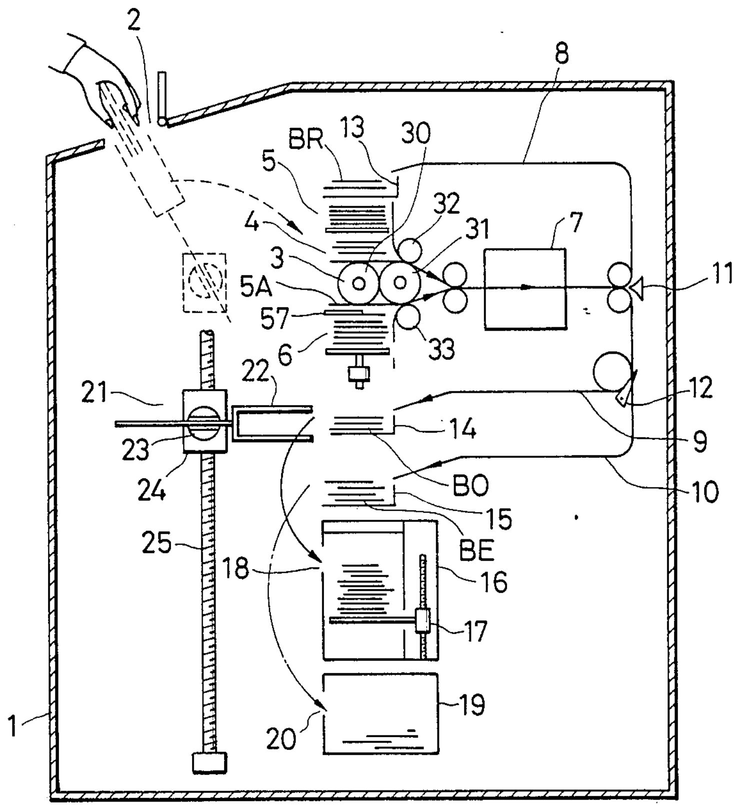
FIG. 1 is a schematic plan view showing a constitution of one embodiment of the present invention.

One embodiment of the present invention will hereinafter be described with reference to FIGS. 1 through 7C. There is shown a circular type cash transacting device where the paper currencies that the customer deposit are accumulated after classifying these currencies; and two kinds of currencies, for instance, ten thousand yen notes and thousand yen notes among aforementioned paper currencies are employed for payment.

A casing 1 formed with a money receiving/paying port 2 accommodates a paper currency separating unit 3, a variety of paper currency accumulation units which will be mentioned later, an identifying unit, conveying means, and paper currency transferring means. The paper currency separating unit is defined as a friction separating mechanism consisting of a paper currency feed-out roller, a sending roller and a separating roller which will be mentioned later. A first accumulation unit 4 intended to accumulate the deposit currencies is provided in close proximity to the upper portion of the paper currency separating unit 3. A third accumulation unit 6 designed for accumulating second payment currencies, for instance, thousand yen notes, is provided in the vicinity of the lower portion of the separating unit 3. A second accumulation unit 5 designed for accumulating first, paper currencies, for example, ten thousand yen notes, is disposed at the upper portion of the aforementioned first accumulation unit 4. This third accumulation unit 6 is arranged to enter the first accumulation unit 4 with the help of a moving mechanism.

The deposit currencies accumulated in the first accumulation unit 4 and first payment currencies, i.e., the ten thousand yen notes, which are accumulated in the second accumulation unit 5 are separated piece by piece by dint of forward rotation (rotation in the clockwise direction in the Figure) of the foregoing rollers of the separating unit 3. The second currencies, viz., the thousand yen notes, which are accumulated in the third accumulation unit 6 are likewise separated piece by piece by reversed rotation of the rollers. The identifying unit 7 is positioned on the downstream-side of the separating unit 3 serves to identify the currencies, which are individually separated and carried, with respect to authenticity, monetary classification and the number of carried currencies. On the downstream-side of the identifying unit 7 are provided paper currency carrying passages 8, 9, 10 which are branched off by change-over gates 11, 12.

A fourth accumulation unit 13 accumulates the payment currencies and the currencies whose species is unable to be judged by the identifying unit 7, this accumulation unit 13 being provided at the upper portion of the second accumulation unit 5. A fifth accumulation unit 14 intended to accumulate the currencies unusable in circulation is disposed beneath the third accumulation unit 6. A sixth accumulation unit 15 for accumulating both the currencies unused in circulation when effecting the deposit operations and the abnormal separation currencies when performing the payment operations is provided below the fifth accumulation unit 14. The carrying passage 10 is linked to this sixth accumulation unit 15; the carrying passage 9 is linked to the fifth accumulation unit 14; and the carrying passage 8 is similarly linked to the fourth accumulation unit 13.

A paper currency enclosing cash box 16 intended to accumulate and enclose the currencies is disposed underneath the accumulation unit 15. The paper currencies are taken out of this cash box 16 or enclosed therein when paper currency transferring means which will be stated later enters through an opening 18 formed in the enclosing cash box by vertically moving the currencies which are accumulated and enclosed by use of paper currency position adjusting means. The damaged and uncirculated currencies are put through an opening 20 into a paper currency reject box provided at the lower portion of the enclosing cash box 16. The paper currency transferring means 21 transfers a plurality of the paper currencies en bloc. This paper currency transferring means 21 is composed by: a hand member 22, capable of moving to and fro, for grasping the currencies; rotation means for imparting a rotary motion to the hand member 22; guide supporting means 24 for moving the hand member 22 up and down; and a drive screw 25. This paper currency transferring means 21 is capable of transferring a plurality of the currencies en bloc in order that the paper currencies are accumulated in and taken out of the accumulation units 4, 5, 6, 13, 14, 15, enclosed in and taken out of the enclosing cash box 16, and enclosed in the reject cash box 19. Hence, a way in which the hand member 22 is driven is of no importance.

Figure 2:
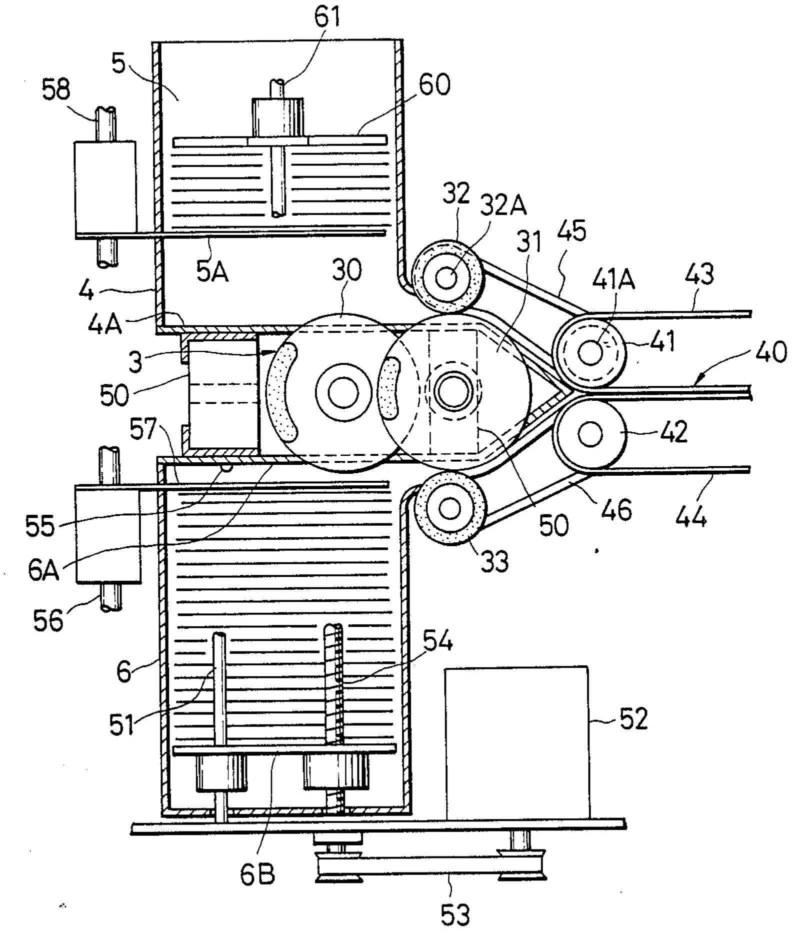
FIG. 2 is a view showing a constitution of a separating unit of FIG. 1.
Figure 3:
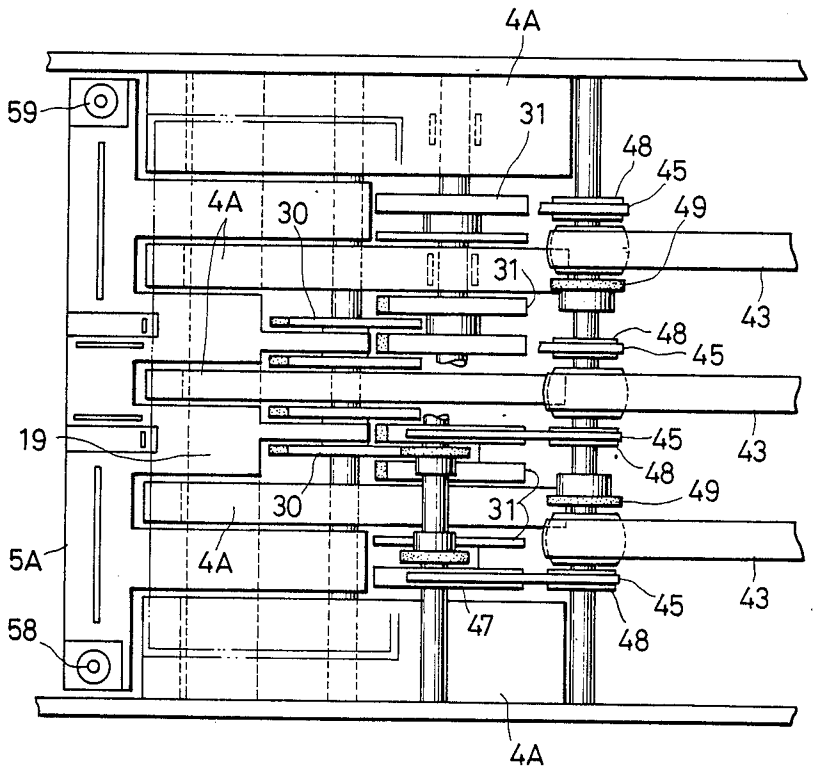
FIG. 3 is a plan view of the separating unit of FIG. 2.

The detailed configurations of the paper currency separating unit 3, the first, second and third accumulation units 4, 5, 6 will be explained with reference to FIGS. 2 and 3.

The paper currency separating unit 3 is equipped with: a feed-out roller 30 defined as feeding means for feeding out the deposit currencies accumulated in the first accumulation unit 4, or the first payment currencies, i.e., the ten thousand yen notes, which are accumulated in the second accumulation unit 5, or the second payment currencies, viz., ten thousand yen notes, which are accumulated in the third accumulation unit 6; a sending roller 31 defined as sending means for sending out the thus fed currencies in a carrying passage 40; and first and second separating rollers 32, 33 which are combined to form separating means and are so disposed in a paper currency feed-out unit of the first and second accumulation units 4, 5 as to be in contact with the sending roller 31. The first and second separating rollers 32, 33 designed for preventing overlap-transfer of paper currencies have their outer peripheries composed by high friction members. Carrying rollers 41, 42 are wound with carrying belts 43, 44, respectively. These carrying belts 43, 44 which are so disposed as to come in contact with each other are combined to form a carrying passage 40. This arrangement is suited to carry the currencies while being sandwiched in between these belts 43, 44. Round belts 45, 46 moved by the sending roller 31 are, as illustrated in FIG. 3, wound on freely rotatable loose rollers 47, 48. The loose roller 47 is fitted to a shaft 32A of the separating roller 32, and the loose roller 48 is fitted to a shaft 41A of the carrying roller 41. On the other hand, the unillustrated round belt 46 is wound on other loose rollers disposed as in the case of the loose rollers 47, 48 wound with the round belt 45. A rubber roller 49 fixed to two pieces of carrying roller shafts 41A rotate together with the carrying roller 41. This rubber roller 49 is provided with a view to stably sending the paper currencies separately sent from the first accumulation unit 4 or the second accumulation unit 5 or the third accumulation unit 6 to the carrying passage 40 while seizing them.

The first accumulation unit 4 for receiving and accumulating the deposit currencies is equipped with a bottom plate 4A which performs a function of a carrying guide for the paper currencies. This bottom plate 4A is so fixed by a fixing member 50 that it is positioned above the feed-out roller 30 and the sending roller 31. The third accumulation unit 6 for accumulating the thousand yen notes defined as the second payment currencies includes an upper plate 6A serving as the carrying guide for the currencies. This upper plate 6A is fixed by the fixing member 50 in such a way that it is disposed below the feed-out roller 30 and the sending roller 31. Furthermore, the third accumulation unit 6 for accumulating the second currencies, i.e., the thousand yen notes, subsumes a pressing bottom plate 6B for pressing the upper plate 6A. This pressing bottom plate 6B is guided by a guide rod 51 and moves vertically by dint of the rotation of a screw shaft 54 driven through a timing belt 53 by a motor 52. The pressing bottom plate 6B is raised by the actuation of the motor 52, whereby the second currencies, viz., the thousand yen notes, which are accumulated on the pressing bottom plate 6B push up a press detecting roller 55 at a given pressure. As a result, the motor 52 halts and the pressing bottom plate 6B ceases to ascend. Moreover, the third accumulation unit 6 has a partition plate 57 for releasing the second currencies, i.e., the thousand yen notes, accumulated on the pressing bottom plate 6B from a state of being in contact with the feed-out roller 30 or for permitting them to come in contact therewith by cooperating with the up-and-down movement of the pressing bottom plate 6A. The partition plate 57 assumes a comblike configuration so as not to interfere with the upper plate 6A. This plate 57 is guided by a guide shaft 56 and moves up and down with the help of the screw shaft operated by the motor (not illustrated). A bottom plate 5A constituting the second accumulation unit 5 is installed along a guide shaft 58 on the first accumulation unit 4 in a vertically movable manner. This bottom plate 5A is, as illustrated in FIG. 3, formed in the comb-like configuration so as not to interfere with the bottom plate 4A of the first accumulation unit 4. The bottom plate 5A makes the up-and-down motion with the aid of the screw shaft driven by the motor. The second accumulation unit 5 is provided with a pressing plate 60 for pressing the first payment currencies, i.e., the ten thousand yen notes on the bottom plate 5A. This pressing plate 60 is guided by a guide shaft 61. The bottom plate 5A of the aforementioned second accumulation unit 5 is invested with a function to press the deposit currencies accumulated on the bottom plate 4A of the first accumulation unit 4 against the feed-out roller 30.

Figure 4:
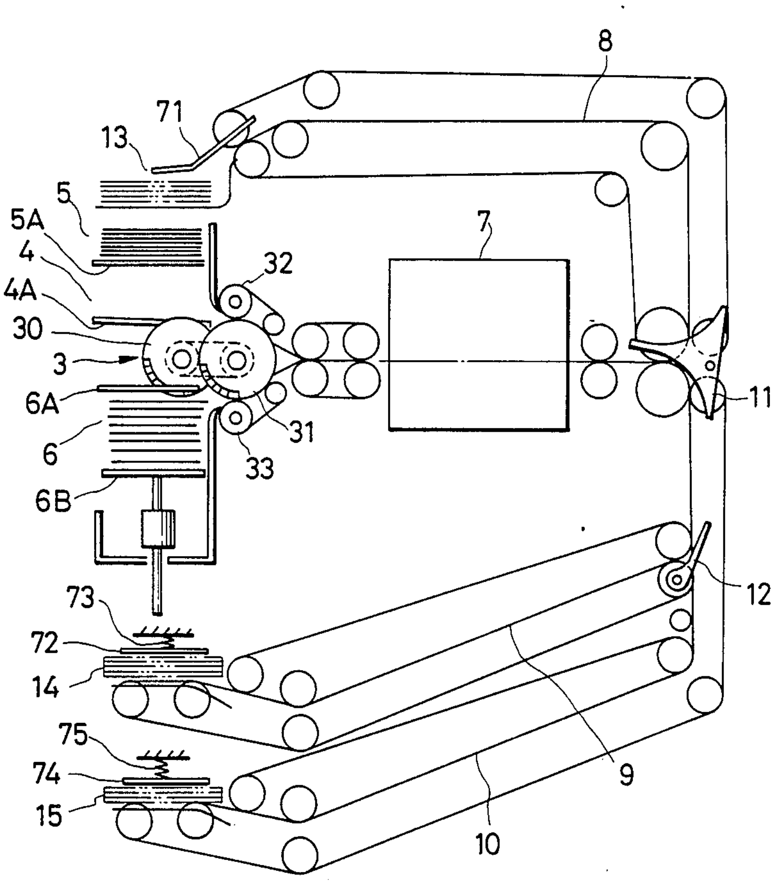
FIG. 4 is a view showing operations of separating and accumulating paper currencies in this embodiment.

Referring to FIG. 4, there is shown a general configuration relative to the paper currency separating unit 3, the individual accumulation units 4, 5, 6, 13, 14, 15 and the carrying passage. In the Figure, the components marked with the same symbols as those of FIG. 1 are exactly the same. The first accumulation unit 4 ordinarily remains unoccupied. The paper currencies are accumulated in this unit 4 only when being carried in by the paper currency transferring means 21. The ten thousand yen notes defined as the first payment currencies are accumulated in the second accumulation unit 5, and on the other hand the thousand yen notes referred to as the second payment currencies are accumulated in the third accumulation unit 6. The fourth accumulation unit 13 is provided with a guide 71. The fifth and sixth accumulation units 14, 15 are respectively equipped with paper currency pressing plates 72, 74 coupled with springs 73, 75.

The operations required for the deposit and payment transactions in one embodiment of the present invention will be explained with reference to FIGS. 1 through 5 and the flowcharts of FIGS. 6A through 7C.

At the first onset, when the operation starts, there is made a detection as to whether or not the first payment currencies, viz., the ten thousand yen notes, are sufficiently accumulated in the second accumulation unit 5 (step 101). If insufficient, the paper currency transferring means 21 is actuated. An adequate amount of the first payment currencies, i.e., the ten thousand yen notes, which are accommodated beforehand in the enclosing cash box 16 are taken out by means of the hand member 22, and the thus processed currencies are set in the second accumulation unit 5 (step 102). The subsequent step is to detect whether or not the second payment currencies, viz., the thousand yen notes, are sufficiently accumulated in the third accumulation unit 6 (step 103). If insufficient, the paper currency transferring means 21 is operated. A proper amount of the second currencies, viz., the thousand yen notes, which are previously enclosed in the enclosing cash box 16 are taken out by the hand member and are then set in the third accumulation unit 6 (step 104).

When the operation begins, the hand member 22 of the transferring means 21 is, as indicated by a dotted line of FIG. 1, positioned at the money receiving/paying port 2. When there is a request for the deposit transaction (step 105), whether the hand member 22 is situated at the money receiving/paying port 2 or not is detected (step 106). If not, the hand member 22 is made to move to this port 22 (step 107). In the case of the hand member 22 being in that position, the third accumulation unit 6, the pressing bottom plate 6B and the partition plate 57 are lowered, whereas the bottom plate 5A of the second accumulation unit 5 is raised (step 107). The next step is to detect the presence of the paper currencies at the money receiving/paying port 2 (step 108). If nonpresence is confirmed, an instruction to deposit the paper currencies is given to the customer (step 109). When the customer inserts the currencies in the money receiving/paying port 2, the hand member 22 of the paper currency transferring means 21 receives the deposit currencies intruded by the customer and then sets them in the first accumulation unit 4 (step 110). After setting the currencies, the hand member 22 retreats from the first accumulation unit 4 and moves to the fifth accumulation unit 15 (step 111). Then, the bottom plate 5A of the second accumulation unit 5 is descended, and the deposit currencies of the first accumulation unit 4 are pressed against the feed-out roller 30 and the sending roller 31 of the separating unit 3 (step 112).

The feed-out roller 30 and the sending roller 31 of the separating unit 3 are made to rotate in a clockwise direction of the Figure (step 113), and the paper currencies are fed out by dint of frictional forces of the high friction members (for instance, rubber) disposed on their circumferential surfaces. Thereafter, the currencies are separated piece by piece by the frictional forces of the separating roller 32. The thus separated currencies pass through the carrying passage and then undergo an identifying process in the identifying unit 7 with respect to the authenticity, monetary classification and possibility to be reused (usable or unusable for payment in circulation). The destination of false and unidentifiable currencies is changed over by the change-over gate 11 to the carrying passage 8, and these currencies are led through the guide 71 to the fourth accumulation unit 13 so as to be accumulated therein.

On the other hand, among the paper currencies which prove to be true, for example, the circularly usable ten thousand yen notes are led through the change-over gates 11, 12 to the fifth accumulation unit 14, whereas the non-circular currencies such as thousand, five thousand, five hundred yen notes and the considerably damaged currencies are led through above-described gates to the sixth accumulation unit 15. The thus led currencies are sequentially accumulated in these accumulation units. The paper currencies carried through the carrying passage 9 which is constituted by, as illustrated in FIG. 4, carrying belts are sequentially fed in between the pressing plate 72 pressed by a spring 73 and the belt by dint of carrying force of the belt, whereby they are accumulated in the fifth accumulation unit 14. The sixth accumulation unit 15 similarly undergoes the accumulation of currencies by sequentially feeding the currencies in between the pressing plate 72 pressed by a spring 75 and the belt. If there is no paper currency in the first accumulation unit 4 (step 114), the feed-out roller 30 and the sending roller 31 of the separating unit 3 cease their operations (step 115).

Reject currencies BR among the deposit currencies are returned to the fourth accumulation unit 13 and accumulated therein. Immediately when the currencies are accumulated in this fourth accumulation unit 13 (step 116), the hand member 22 of the paper currency transferring means 21 moves and grasps the reject currencies BR, thus transferring them to the money receiving/paying port 2 (step 117). The thus transferred currencies are once brought back to the customer (step 118). As occasion demands, the paper currencies whose undesirable conditions (a folded state or the like) have been restored are received (step 119) and are then set in the first accumulation unit 4 by performing the above-described operations. The reject currencies BR are once again separated and accumulated. After the reject currencies Br have completely undergone the process, the customer makes sure of the amount of money. When the customer indicates the deposit, the recorded bankbook or the card is delivered to the customer (step 121). In the second place, where the ten thousand yen notes are accumulated in the fifth accumulation unit 14 (step 122), these paper currencies BO are seized by the hand member 22 of the aforementioned transferring means 21. Then the currencies BO are transferred to the enclosing cash box 16 so as to be enclosed therein (step 123). If the non-circular currencies are accumulated in the sixth accumulation unit 15 (step 124), these non-circular currencies BE are immediately transferred by means of the hand member 22 and accommodated in a reject box 19 (step 125). In the wake of this step, the hand member 22 of the paper currency transferring means 21 is made to move to the fourth accumulation unit 13 (step 126). While on the other hand, if the customer does not request the deposit, the currencies are returned to the money receiving/paying port 2 (step 127). Subsequently, the bankbook or the card is delivered (step 128).

All the received currencies which are thus set in the first accumulation unit 4 are in the great majority of cases enclosed in the enclosing cash box 16 or in the reject box 19, thereby terminating the deposit transaction. In this state, the paper currencies are not left at all in the first accumulation unit 4 and it is therefore feasible to immediately deal with the next deposit transaction.

In the case of the above-described operation to count the deposit currencies, as shown in FIG. 1, the partition plate 57 in the third accumulation unit 6 behaves by virtue of the unillustrated actuator, thereby pushing down the currencies of the third accumulation unit 6. At this time, the currencies do not come in contact with the feed-out roller 30 and the sending roller 31.

When the paper currencies are paid, the operations are effected in the following manner.

Figure 5:
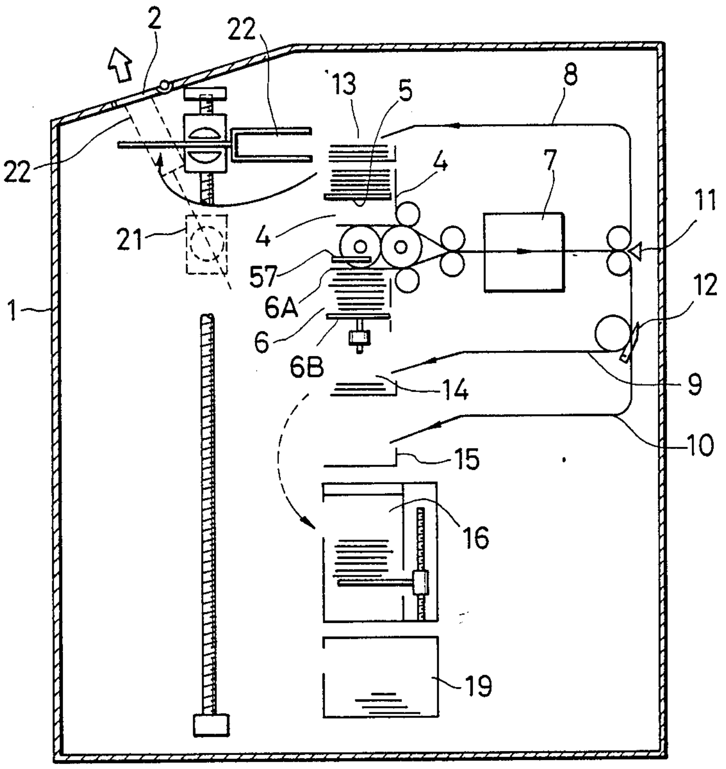
FIG. 5 is a schematic front view showing operations of payment transaction in this embodiment.
Figure 6A:
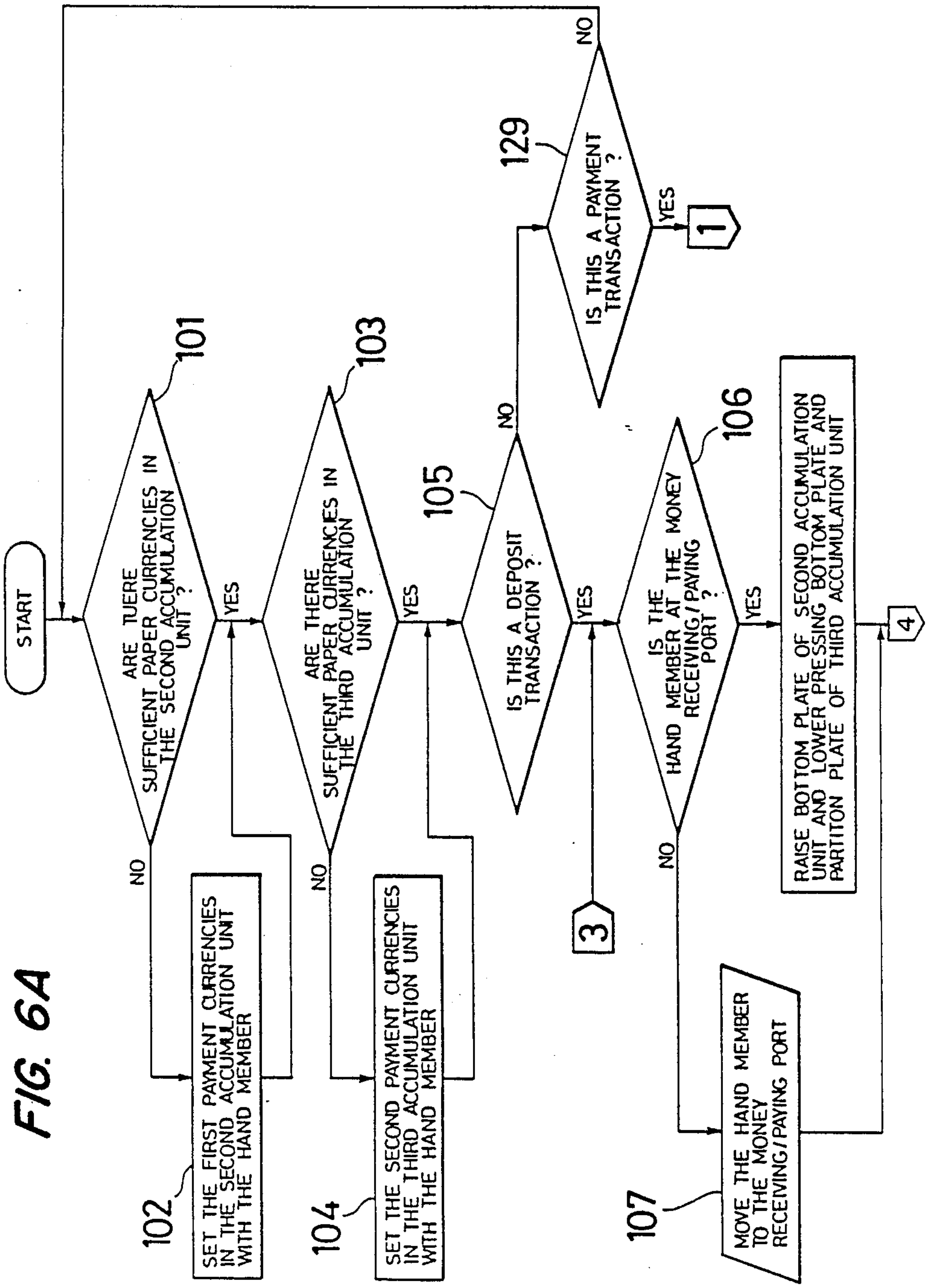
FIGS. 6A, 6B, 6C, 6D and 7 are flowcharts which illustrate the operation when deposit and payment transactions are requested in this embodiment.
Figures 6, 6B:
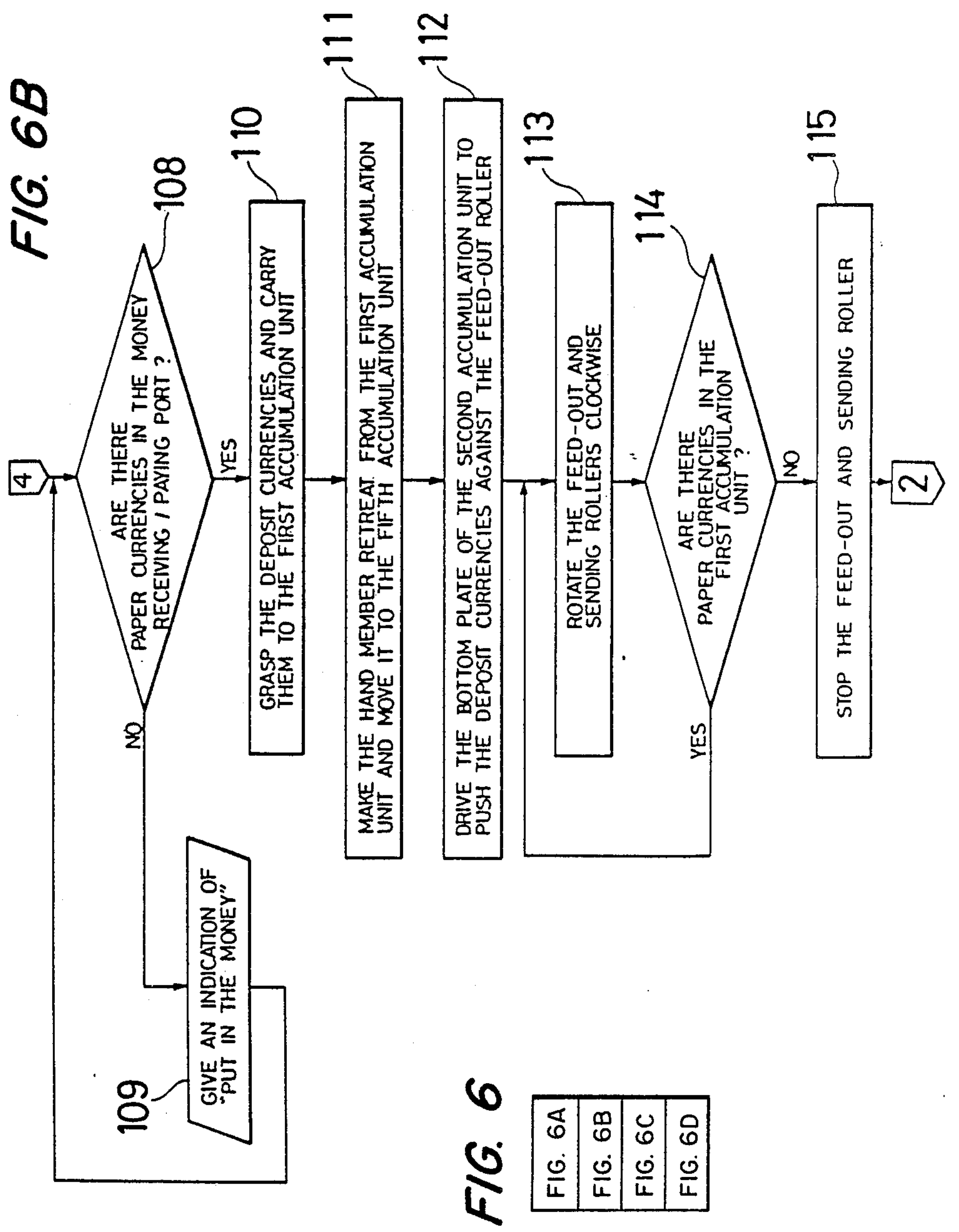
Figure 6C:
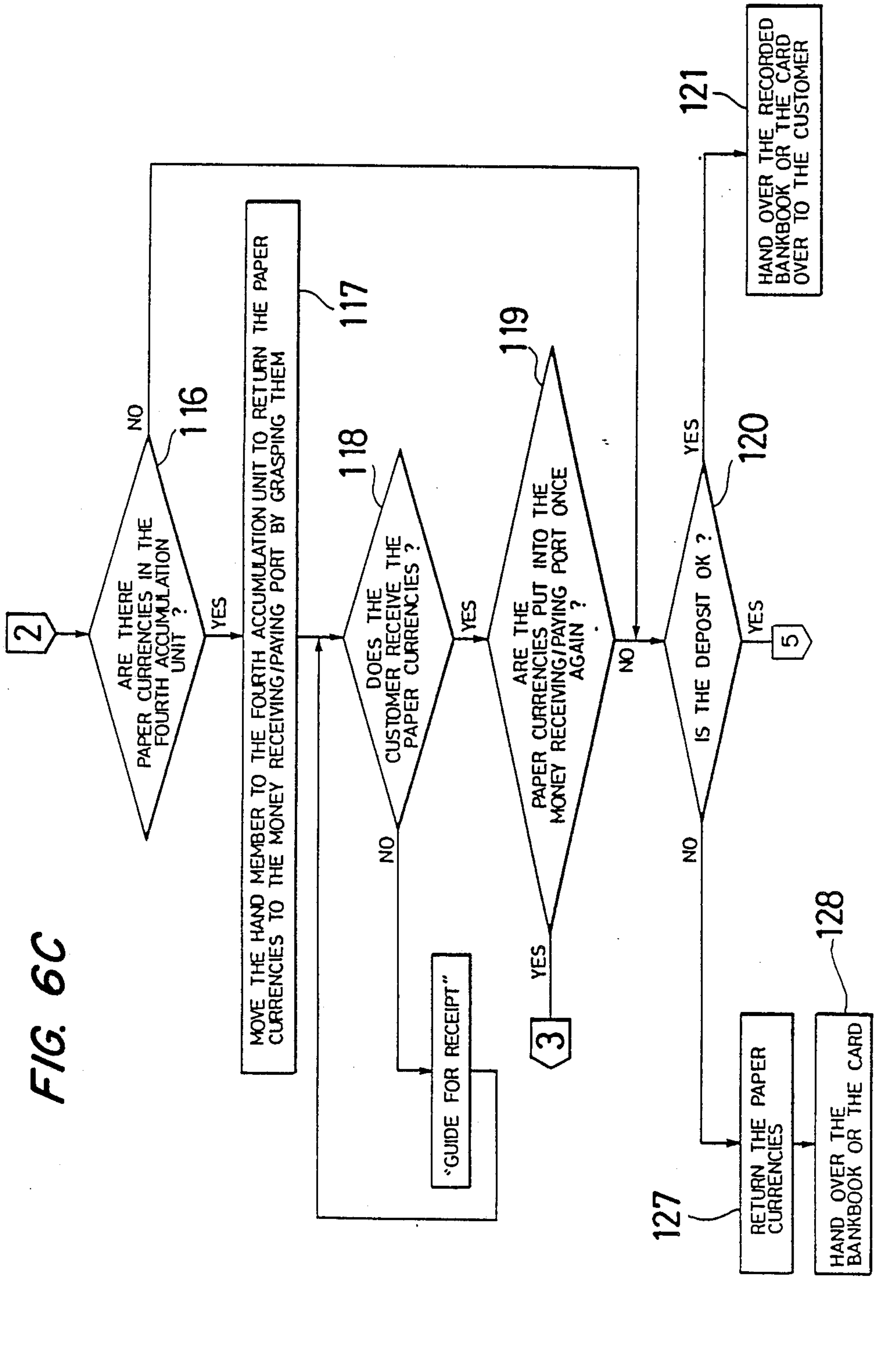
Figure 6D:
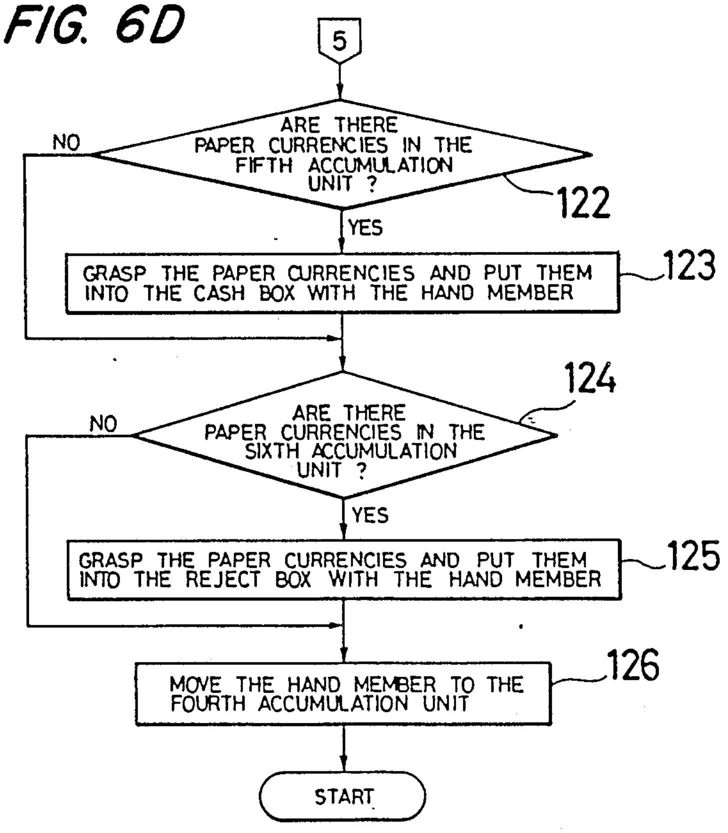

When the cash dealing device begins its operation (when the transaction is practicable), the paper currency transferring means 21 is, as illustrated in FIG. 5, actuated, and an adequate amount of the first currencies—ten thousand yen notes—which are previously accommodated in the enclosing cash box 16 are taken out. These currencies are set beforehand in the second accumulation unit 5. Simultaneously, the second currencies—the thousand yen notes—which are previously accommodated in the enclosing cash box 16 are likewise set in the third accumulation unit 6 (steps 101 to 104 in the flowchart of FIG. 6A). As shown in FIG. 2, the third accumulation unit 6 is fitted with the paper currency pressing bottom plate 6B and has a space for accommodating the currencies with the aid of the unillustrated actuator when the currencies are to be set. After setting the currencies, the accumulated currencies are arranged to be pressed against the feed-out roller 30 and the sending roller 31 by means of, for instance, the screw shaft 54. When a request for the payment transaction is made (step 129 shown in FIG. 6A), the operations are carried out as shown in the flowchart of FIGS. 7A–7C.

Figures 7, 7A:
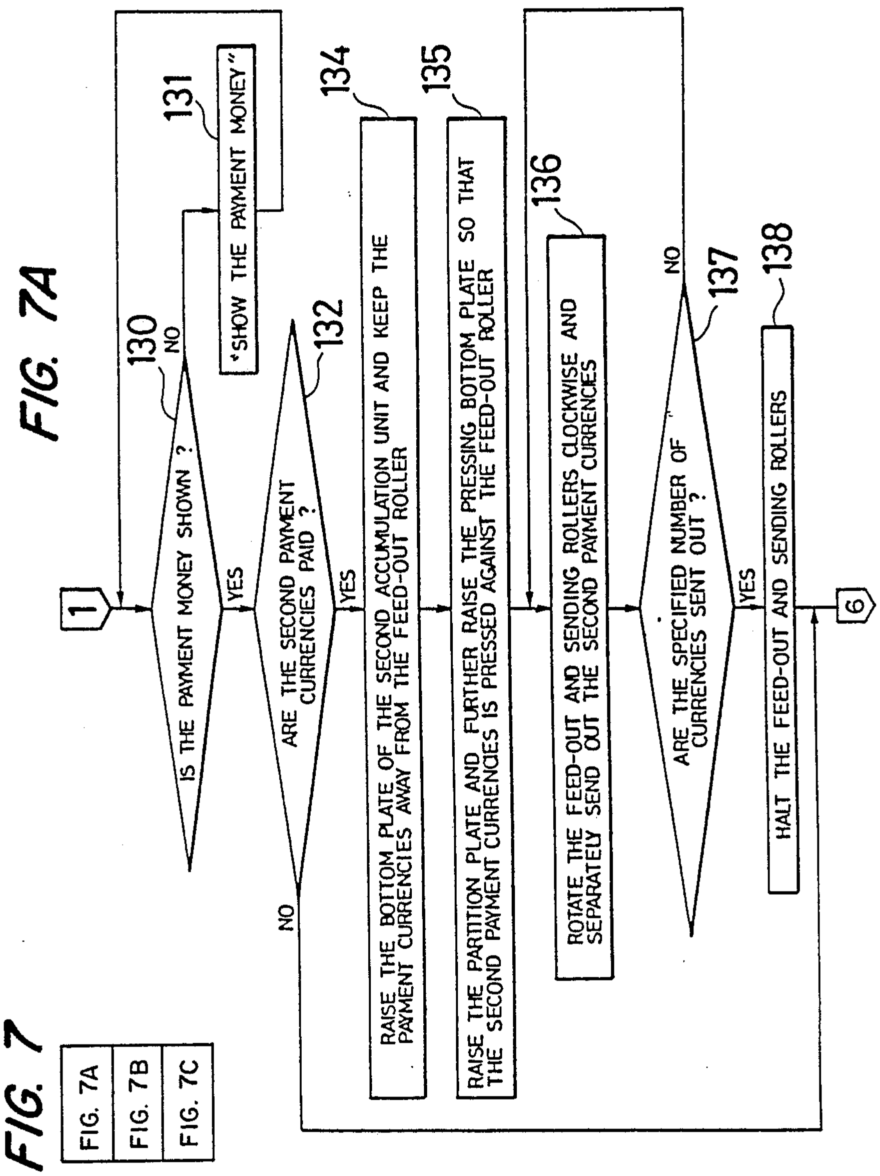
Figure 7B:
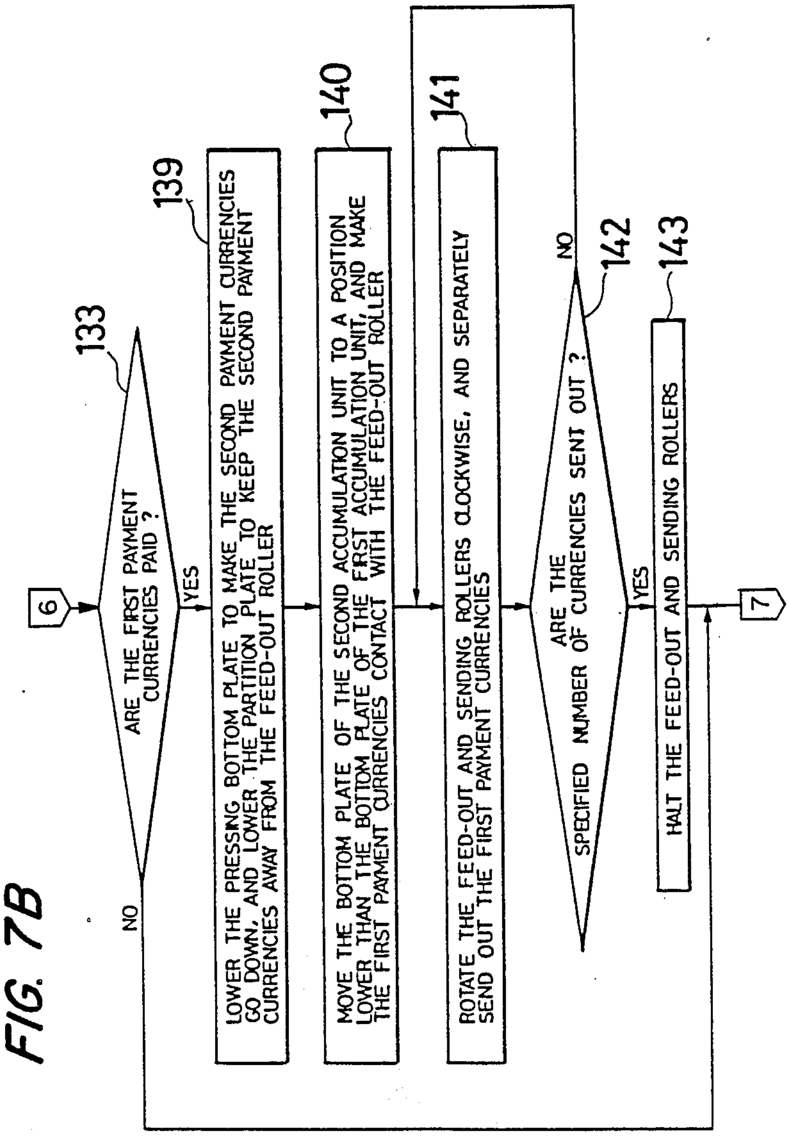
Figure 7C:
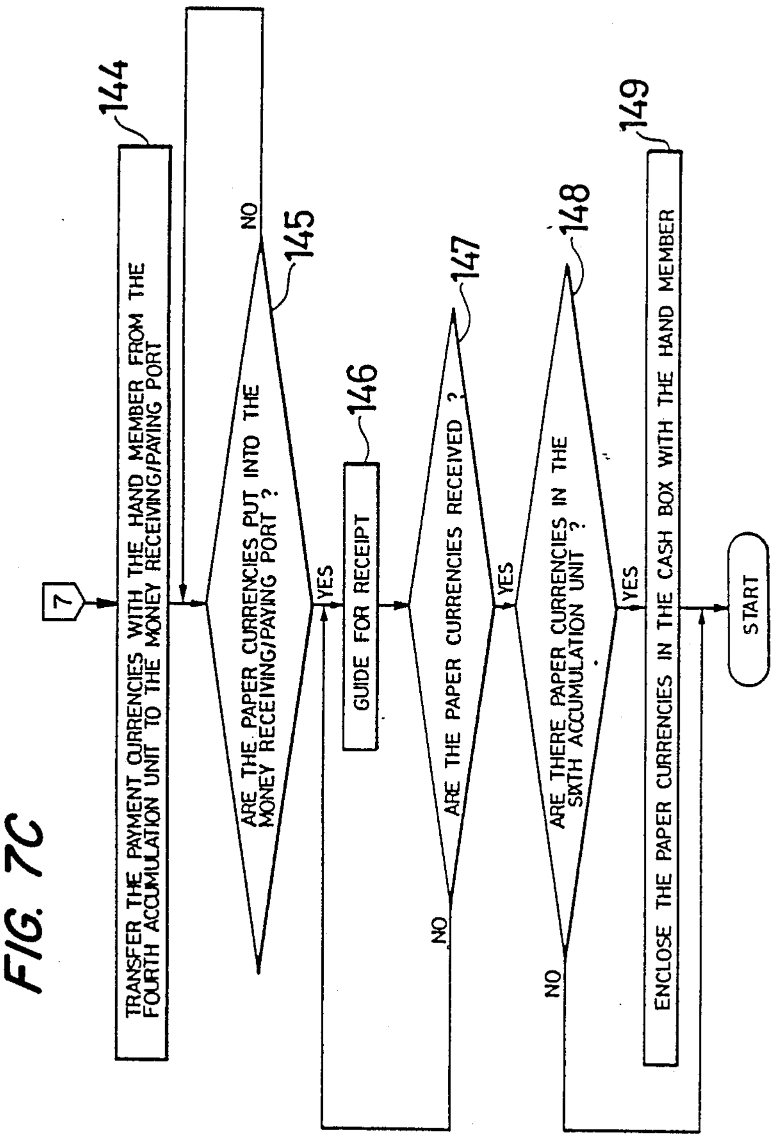

To start with, as seen in FIG. 7A whether the customer exhibits an amount of the payment money or not is confirmed (step 130). If not, an indication to show the amount of the payment money is given to the customer (step 131). The subsequent step is to make sure of the payment in thousand yen notes defined as the second currencies (step 132) or in ten thousand yen notes defined as the first currencies (step 133). In the case of the second currencies, i.e., the thousand yen notes, the bottom plate 5A of the second accumulation unit 5 is ascended, and the first currencies, viz., the ten thousand yen notes, are spaced away from the feed-out roller 30 and the sending roller 31 (step 134). After this step, the partition plate 57 of the third accumulation unit 6 is made to retreat upwards, and the pressing bottom plate 6B is lifted (step 135).

Owing to this step, the currencies of the third accumulation unit 6 are brount into press-contact with the feed-out roller 30 and the sending roller 31. When the feed-out roller 30 and the sending roller 31 rotate in the anticlockwise direction in the Figure, the paper currencies are fed out by dint of action of friction rollers disposed on their circumferential surfaces and are, as in the previous case, sequentially separated piece by piece by the frictional forces of a separating roller 33 (step 136). Each of the thus separated currencies passes through the indentifying unit 7 and is led via the carrying passage 6 to the fourth accumulation unit 13 through the intermediary of the change-over gate 11. The thus led currencies are accumulated in the fourth accumulation unit 13. If the paper currencies are in the abnormal separation state, for instance, when they are transferred while being superposed on each other, the direction of these currencies is changed over by the change-over gate 11 to, for example, the sixth accumulation unit 15 where such currencies are accumulated. After the specified number of paper currencies have been separated, sent out and accumulated (step 137), the feed-out roller 30 and the sending roller 31 are halted (step 138). Upon a request for the payment of the first currencies, i.e., the ten thousand yen notes (step 133), the pressing bottom plate 6B of the third accumulation unit 6 is lowered so as to descend the second payment currencies of the thousand yen notes. Thereafter, the partition plate 57 goes down, whereby the second payment currencies, viz., the thousand yen notes, are spaced away from the feed-out roller 30 and the sending roller 31 as well (step 139). The bottom plate 5A provided within the second accumulation unit 5 moves to a position lower than the bottom plate 4A of the first accumulation unit 4, whereby the ten thousand yen notes—the first currencies—of the second accumulation unit 5 are brough into press-contact with the feed-out roller 30 and the sending roller 31 as well (step 140). At this time, the first currencies of the ten thousand yen notes are individually separated and sent out by rotating both the feed-out roller 30 and the sending roller 31 in the clockwise direction in the Figure (step 141). The thus separated currencies are transferred via the identifying unit 7 to the fourth accumulation unit 13 so as to be accumulated therein. The paper currencies which undergo the abnormal separating condition such as the overlap-transfer are led by the change-over gate 11 to, for instance, the sixth accumulation unit 15 where the currencies are accumulated. After the specified number of paper currencies have been separated, sent out and accumulated (step 142), the feed-out roller 30 and the sending roller 31 are halted (step 143). It is to be noted that the procedures which conform to the request for the payment of the first currencies of the ten thousand yen notes and the second currencies of the thousand yen notes are the same in either case.

When the proper number of paper currencies are accumulated in the fourth accumulation unit 13, the hand member 22, as illustrated in FIG. 5, transfers the currencies to the money receiving/paying port 2 (step 144). After confirming whether the payment currencies are put into this port 2 or not (step 146), an indication to receive the money is given to the customer (step 145). After the customer has received the payment currencies from the money receiving/paying port 2 (step 147), the presence of the reject currencies accumulated in the sixth accumulation unit 15 is detected (step 148). The reject currencies in the sixth accumulation unit 15 are enclosed in the enclosing cash box 16 or in the reject box 17 with the aid of the hand member 22 (step 149).

If the separating unit 3 has high separating efficiency, the currencies are usually rejected. Inasmuch as there is no paper currency to be accumulated in the sixth accumulation unit 15, the fifth and sixth accumulation units 14, 15 remain free. As a result, it is possible to keep the device in such a state that the deposit transaction can always be performed.

In the above-described embodiment, the description is focused on the friction separating system in which the feed-out roller and the sending roller are employed as the paper currency separating unit. However, if there is adopted a vacuum adsorption drum type separating mechanism which utilizes vacuum adsorptive forces in order to adsorptively transfer the paper currencies, as a matter of course, the same effects can be obtained.

Moreover, in the above-described embodiment, the first currencies, i.e., the ten thousand yen notes, are previously accommodated in the upper portion of the paper currency enclosing cash box 16, while the second currencies, viz., the thousand yen notes, are accommodated in the lower portion thereof. The enclosing cash box 16 may, however, be sectioned into first and second payment currency enclosing portions or may be composed by two smaller enclosing cash boxes. A pressing plate for vertically shifting the currencies and a driving mechanism for driving this plate may be provided in the cash box. In addition, only the thousand yen notes defined as the second payment currencies may be enclosed in the paper currency enclosing cash box, and the first payment currencies, viz., the ten thousand yen notes, may manually be accumulated beforehand in the second accumulation unit 5. In the above-mentioned embodiment, the ten thousand yen notes defined as the first payment currencies, are accumulated in the second accumulation unit 5, and the thousand yen notes defined as the second payment currencies are accumulated in the third accumulation unit 6. However, the second and third accumulation units are reversible in regard to the accumulation of such currencies.

As explained earlier, according to the embodiment of the present invention, it is feasible to keep the device in a state wherein the payment and deposit transactions can immediately be executed, since the three accumulation units (paper currency enclosing units) are installed in the single separating mechanism. Consequently, it is possible to miniaturize the device and to decrease the cost as compared with the conventional device mounted with intricate and expensive separating mechanisms designed for the deposit and payment currencies, respectively. A multiplicity of paper currencies are transferred en bloc and hence the mechanisms for individually transferring the currencies can be reduced in number. By virtue of this advantage the device can be diminished both in size and in cost. Furthermore, a time required for the process can be shortened, so that the transacting time is considerably reduced. As a result, the customers do not have to wait for a long time and the serviceability can be improved. It is possible to increase the number of transactions of the device per day and to extremely improve the efficiency both in banking capital and in operation.

In the above-described embodiment, the second accumulation unit 5 for accumulating the ten thousand yen notes serving as the first currencies and the third accumulation unit 6 for accumulating the thousand yen notes serving as the second currencies are disposed in the vicinity of the separating unit 3. The payment currencies involve the use of two kinds of paper currencies such as, for instance, the first currencies, i.e., the ten thousand yen notes, and the second currencies, viz., the thousand yen notes. Instead, one kind of payment currencies, for example, the ten thousand yen notes alone, are permitted for the transaction.

Figure 8:
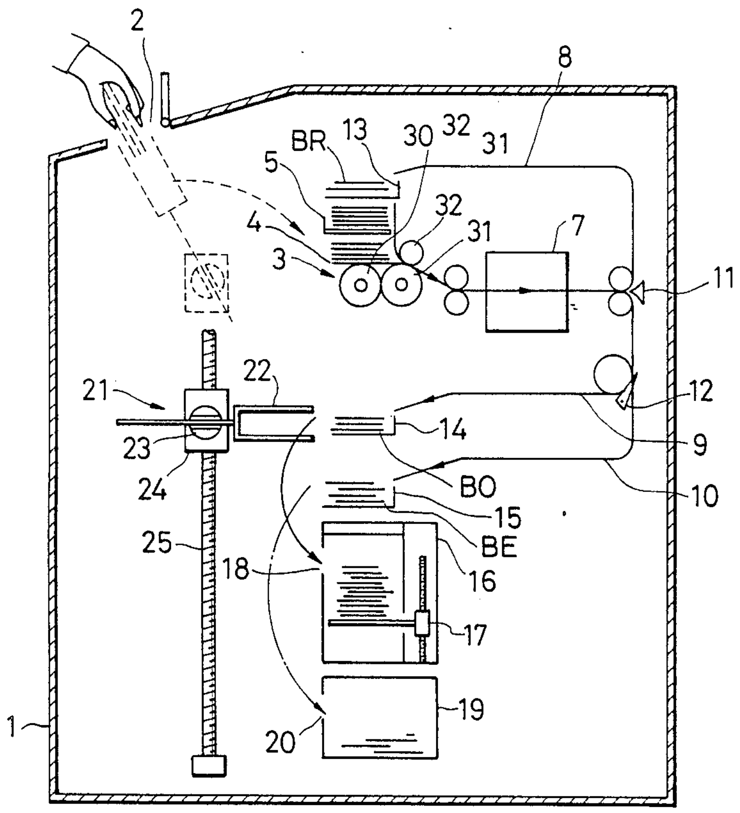
FIG. 8 is a schematic front view showing a constitution of another embodiment of the present invention.
Figure 9:
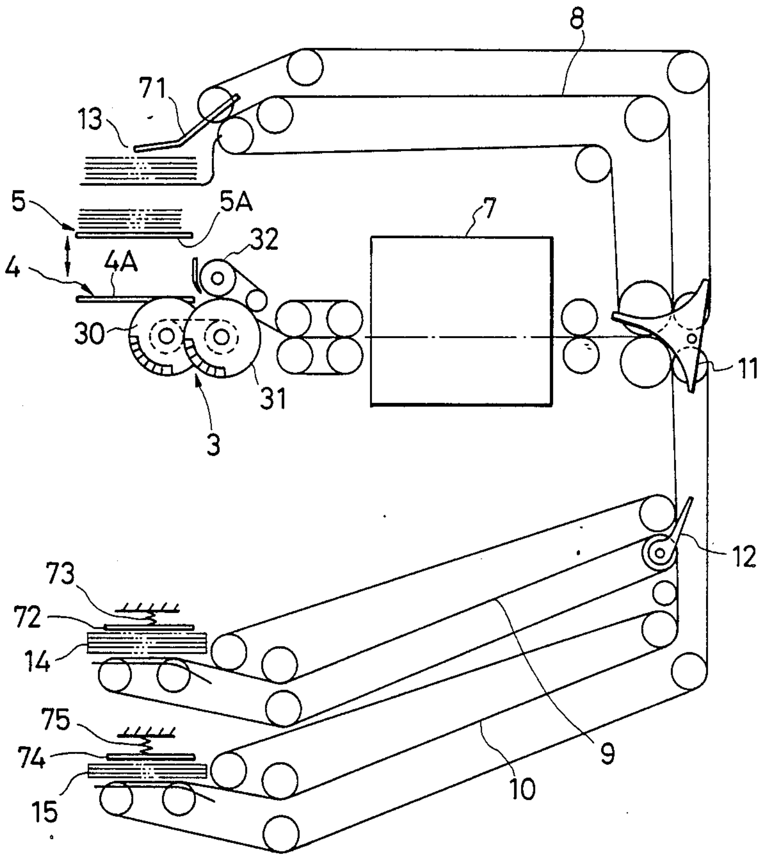
FIG. 9 is a view showing operations of separating and accumulating the paper currencies in this embodiment.
Figure 10:
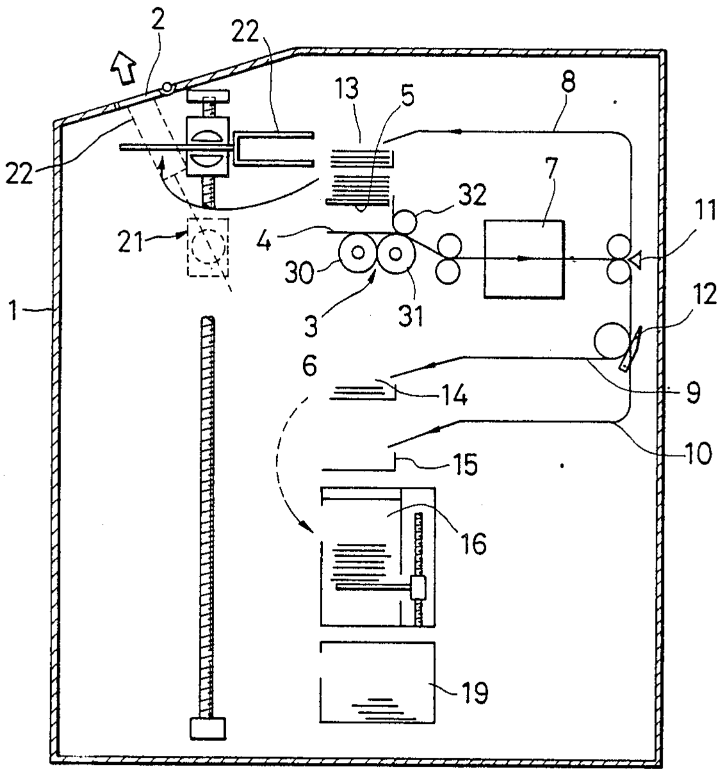
FIG. 10 is a schematic front view showing operations of payment transaction in this embodiment.
Figure 11:
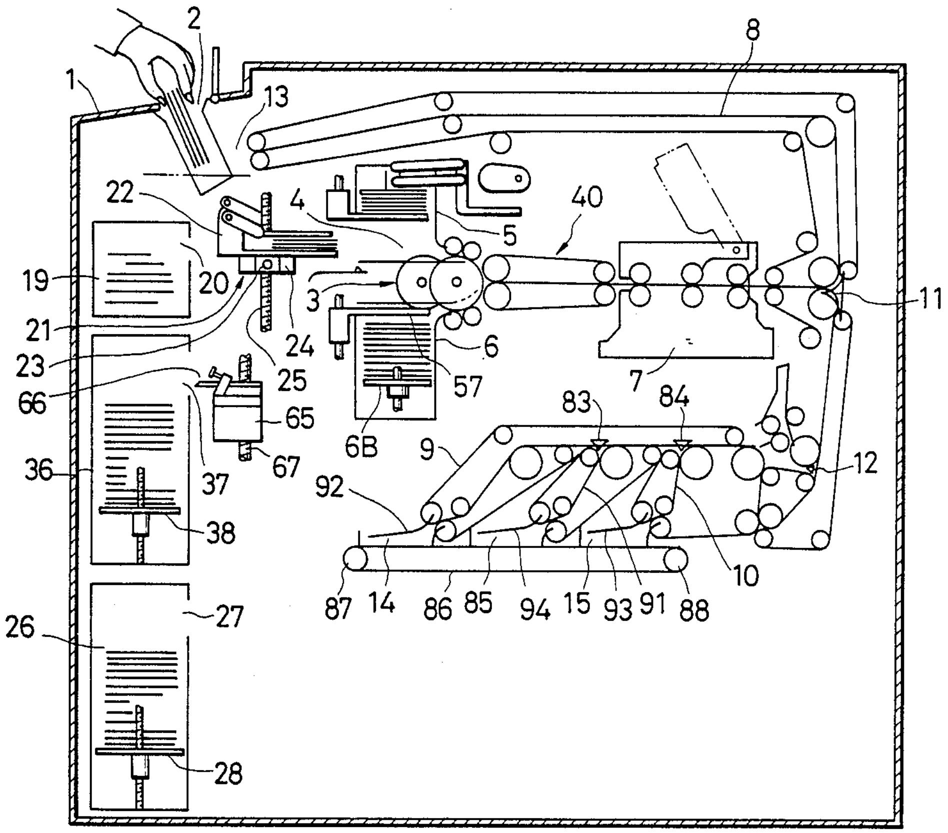
FIG. 11 is a schematic front view showing a constitution of still another embodiment of the present invention.

FIGS. 8 to 10 in combination show another embodiment of the present invention wherein the device deals with one kind of paper currencies. In this embodiment, there is omitted the separating/transferring mechanism for separating/sending out both the thousand yen notes defined as the second payment currencies and other paper currencies which are accumulated in the third accumulation unit 6, this mechanism being employed in the embodiment of FIG. 1. In such a constitution, the paper currencies deposited from the money receiving-/paying port 2 are grapsed by the hand member 22 of the paper currency transferring means 21 and accumulated in the first accumulation unit 4. The deposit currencies accumulated in the first accumulation unit 4 are separated piece by piece by means of the separating unit 3 and are then carried by the carrying means to the identifying unit 7. The paper currencies which undergo the identifying operations in the identifying unit 7 are classified into the circular currencies and the non-circular currencies. The thus classified currencies are carried to the fifth accumulation unit 14 and the sixth accumulation unit 16 where they are accumulated. After the customer has confirmed the amount of the deposit currencies counted by the identifying unit 7, the hand member 22 of the transferring means 21 transfers the paper currencies to the paper currency enclosing cash box 16 and the reject box 19, thus completing the deposit transaction. On the occasion of paying the paper currencies, the hand member 22 of the transferring means 21 takes an adequate amount of the ten thousand yen notes serving as the payment currencies out of the paper currency enclosing cash box 16 by seizing them. Such paper currencies are accumulated as the payment currencies in the second accumulation unit 5. The second accumulation unit 5 is so shifted as to enter the first accumulation unit, and the ten thousand yen notes serving as the second currencies accumulated in the second accumulation unit 5 are separated by the separating unit 3. In the wake of this process, the identifying unit 7 counts the number of the paper currencies that the customer specifies, and the counted currencies are carried by the carrying means to the fourth accumulation unit 13, in which place the currencies are accumulated. The paper currencies accumulated in the fourth accumulation unit 13 are seized by the hand member 22 of the transferring means 1 and transferred to the money receiving/paying port 2 The customer receives such paper currencies, thereby finishing the payment transaction.

In this embodiment, as can be clarified from the description so far made, the single separating mechanism is provided with the first accumulation unit 4 used for the deposit currencies, and the second accumulation unit 5 for the payment currencies which is enterable in the first accumulation unit 4 is disposed at the upper portion within the first accumulation unit 4. With this simple arrangement, it is feasible to maintain the device in such a state that the payment and deposit transactions can immediately be effected. In consequence, the device can be decreased both in size and in cost, as compared with the conventional device equipped with complicated and expensive separating mechanisms designed for the deposit currencies and the payment currencies, respectively.

FIGS. 11 to 14 in combination show still another embodiment of the present invention. In this embodiment, especially at the time of performing the deposit operation, if there are unidentifiable currencies among the deposited paper currencies and the customer suspends the deposit, or at the time of making the payment, the paper currencies, to be paid are transferred directly to the accumulation unit disposed at the money receiving/paying port by belt carrying means instead of the seizure-transfer by use of the hand member of the paper currency transferring means, which method is adopted in the above-described embodiments. A tangible constitution will hereinafter be explained. Virtually the same components as those shown in the previous embodiments are marked with the same symbols, and the detailed description of the constitution is partially omitted.

In this embodiment, the money receiving/paying port 2 is provided with a guide 81 rotatable about a shaft 82. The guide 81 comes to stand vis-á-vis with the fourth accumulation unit 13 by its rotation, whereby this guide 81 turns out to be a guide of the fourth accumulation unit 13. On a moving belt 86 wound on a pulleys 87, 88 are disposed the fifth accumulation unit 14 for accumulating the circulable currencies, for instance, the ten thousand yen notes, the sixth accumulation unit 15 for accumulating the non-circular currencies and a seventh accumulation unit 85 for accumulating the paper currencies circulable in this embodiment, for example, the thousand yen notes. The fifth, sixth and seventh accumulation units, 14, 15, 85 which are respectively provided with guides 92, 93, 94 receive the paper currencies which are transferred through carrying passages 9, 10, 91 and at the same time changed over by means of gates 83, 84. The circulable currencies, for instance, the ten thousand yen and thousand yen notes, are put through front openings 27,. 37 into paper currency enclosing cash boxes 26, 36. The non-circular currencies, for example, the five thousand yen notes and the damaged currencies, which are accumulated in the sixth accumulation unit 15 are enclosed through front opening 20 in the cash box 19. The cash boxes 26, 36 cause the accumulatively enclosed currencies to move up and down with the aid of paper currency position adjusting means 28, 38. When the paper currency transferring means 21 enters through the front openings 27, 37, the currencies are arranged t be enclosed or taken out. For the purpose of further facilitating the take-out of the currencies, gap forming means 65 is so provided as to stand vis-á-vis with the front openings 27, 37 of the cash boxes 26, 36. This gap forming means 65 equipped with an opening member 66 moves vertically with the help of a moving member 67.

The operations which are to be done when requesting the deposit and payment transactions will now be described.

Figure 12:
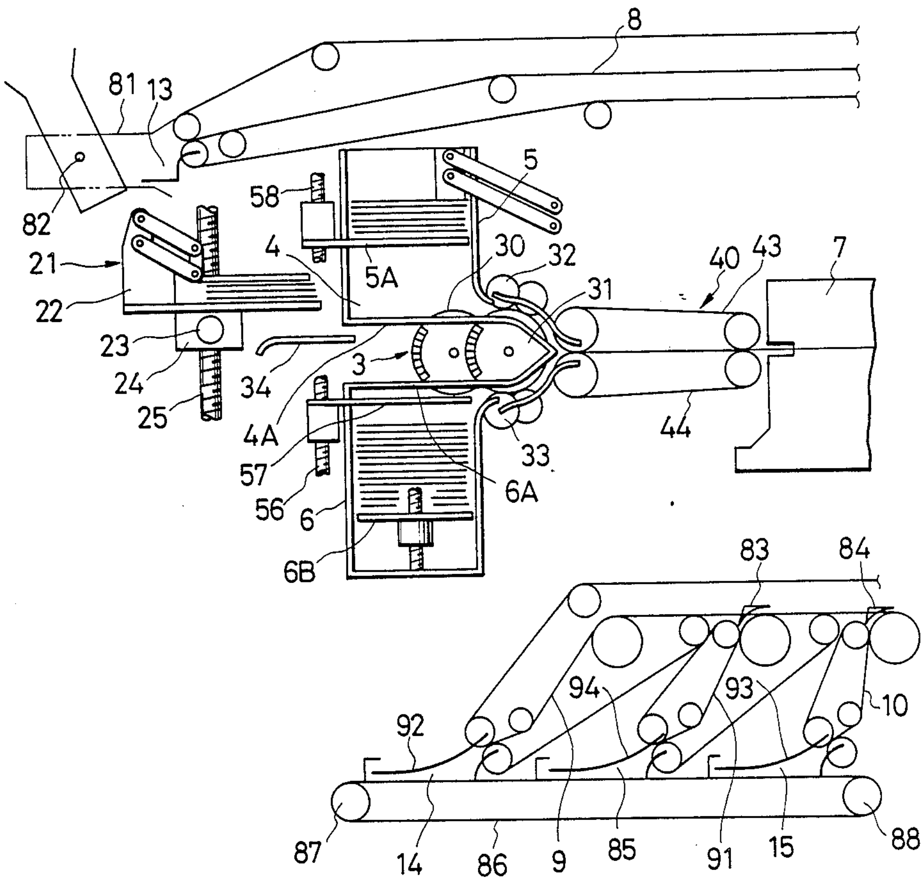
FIG. 12 is a view showing constitutions of the separating unit and a paper currency accumulation unit of FIG. 11.

When the request for the deposit transaction is issued, at the first onset, the guide 81 of the money receiving/paying port 2 comes to a position (indicated by a solid line) of FIG. 12, and the hand member 22 of the transferring means 21 is positioned at the port 2. Upon an insertion of the deposit currencies of the customer, the guide 1 makes a turn so as to stand vis-á-vis with the hand member 22 of the transferring means 21, thereby receiving the deposit currencies inserted by the customer. The guide 81 then rotates about a rotary shaft 82 in the right direction, whereby a guide for the fourth accumulation unit 13 is formed. Prior to this process, simultaneously when the instruction of the deposit transaction is given, the first accumulation unit 4 is formed by lifting the bottom plate 5A of the second accumulation unit 5. The deposit currencies grasped by the hand member 22 of the paper currency transferring means 21 are set in the thus formed first accumulation unit 4. At this time, an opening/closing plate 34 is, as shown in FIG. 12, opened so that the deposit currencies can be set in the first accumulation unit 4. Just when the hand member 22 enters the first accumulation unit 4, the opening/closing plate 34 is closed. Thereafter, the hand member 22 alone is made to retreat and the deposit currencies are thereby set. Subsequently, the feed-out roller 30 and the sending roller 31 of the separating mechanism 3 rotate clockwise, and the currencies are sent out by dint of the frictional forces of the high friction members (for instance, rubber) which are placed on the circumferential surfaces thereof. The paper currencies are separated piece by piece by the frictional force of the separating roller 32. The thus separated currencies pass through the carrying passage and undergo the identifying process with respect to the authenticity, monetary classification and usability in circulation (circulable or uncirculable for payment). The destination of false and unidentifiable currencies is changed over by the change-over gate 11 illustrated in FIG. 11 to the carrying passage 8, and these currencies are led to the fourth accumulation unit 13, in which place they are accumulated while being guided by the guide 81.

While on the other hand, among the paper currencies which prove to be ture, with the aid of the change-over gates 11, 12, 83, 84, for instance, the circulable ten thousand yen notes are led to the fifth accumulation unit 14; the circulable thousand yen notes are led to the seventh accumulation unit 85; and the non-circular five thousand yen notes and the extremely damaged currencies are led to the sixth accumulation unit 15 to be accumulated therein.

Namely, the reject currencies among the deposit currencies are accumulated in the fourth accumulated unit 13, so that such currencies are returned through the carrying passage 8 directly to the customer without employing the transferring means 21. As occasion arises, the reject currencies the unfavourable conditions (a folded state or the like) of which have been restored are again put into the money receiving/paying port 2 and are, as explained earlier, set in the first accumulation unit 4 by the paper currency transferring means 21. It should be noted that the guide 81 positioned opposite to the fourth accumulation unit 13 makes a turn to serve as a guide for the money receiving/paying port 2 when putting the paper currencies into this port once again. The arrangement is thus made to receive the paper currencies.

The circulable currencies, for instance, the ten thousand yen notes, which are accumulated in the fifth accumulation unit 14 are grasped by the hand member 22 of the transferring means 21. Then, these paper currencies are transferred and enclosed in a first paper currency cash box 26. After the currencies of the fifth accumulation unit 14 are completely transferred, the moving belt 86 loaded with the fifth accumulation unit 14, the seventh accumulation unit 85 and the sixth accumulation unit 15 moves to the left-hand by dint of the anticlockwise rotation of the pulleys 87, 88. Owing to this process, the seventh accumulation unit 85 reaches a predetermined position, which is detected by an unillustrated sensor. As a result, the moving belt halts. In the wake of this, the circulable thousand yen notes accumulated in the seventh accumulation unit 85 are seized by the hand member of the transferring means 21 and are then conveyed to the second paper currency enclosing cash box 36 to be enclosed therein. Thereafter, the moving belt 86 is driven once again in order to move the sixth accumulation unit 15 to the predetermined position. The hand member 22 of the transferring means 21 seizes the non-circular currencies accumulated in the sixth accumulation unit 15, and such currencies are transferred and enclosed in the reject box 19. The fifth, sixth and seventh accumulation units 14, 15, 85 are returned to their original positions shown in FIGS. 1, 2 by driving the moving belt 86. As occasion demands, the paper currencies set in the first accumulation unit 4 are again separated to be subjected to the identifying process and are similarly accommodated. At this time, the currencies are rejected once again, and the customer receives the paper currencies accumulated in the fourth accumulation unit 13.

All the receipt paper currencies which are thus set in the first accumulation unit 4 are ordinarily enclosed in the first and second enclosing cash boxes 26, 36 or in the reject box 19, thereby completing the deposit transaction. In this state, since no paper currency is left in the first accumulation unit 4, the device can immediately launch into the next transaction. A pressure under which the paper currencies set in the first accumulation unit 4 come in contact with the feed-out roller 30 of the separating unit 3 is adjusted by an unillustrated pressure sensor fitted to the bottom plate 4A of the first accumulation unit 4 while controlling an amount of descent of the bottom plate 5A of the second accumulation unit 5 by use of an unillustrated motor. In the above-mentioned state where the deposit currencies are counted, the partition plate 57 is actuated by an actuator (not illustrated), and the currencies accumulated in the third accumulation unit 6 are lowered down to the predetermined position so as not to be brought into contact with the feed-out roller 30.

In the second place, the operations needed for paying the currencies will now be explained. When the cash dealing device begins to behave (the transaction permissible time), the paper currency transferring means 21 works and takes an adequate amount of the ten thousand yen and thousand yen notes out of the first and second cash boxes 26, 36. Then the currencies are in advance set in the second and third accumulation unit 5, 6 according to the monetary classification. A way in which the currencies are set in the second and third accumulation units 5, 6 will be mentioned as follows. For instance, in order that the ten thousand yen notes are taken out of the paper currency enclosing cash box 26 and are accumulated in the second accumulation unit 5, the paper currency position adjusting means 28 of the cash box 26 for the ten thousand yen notes is raised at first. Just when an unillustrated pressure means provided at the upper portion within the cash box 26 works, the foregoing position adjusting means 28 is halted, and at the same time the opening member 66 of the gap forming means 65 is set in a predetermined position with respect to the cash box 26. With this process, it is possible to form a gap in such a position that a roughly specified number of paper currencies are present. The unclosed hand member 22 of the transferring means 21 approaches above the thus formed gap and also the currencies. The roughly specified number of paper currencies of the cash box are respectively grasped by closing the hand member 22.

Figure 13:
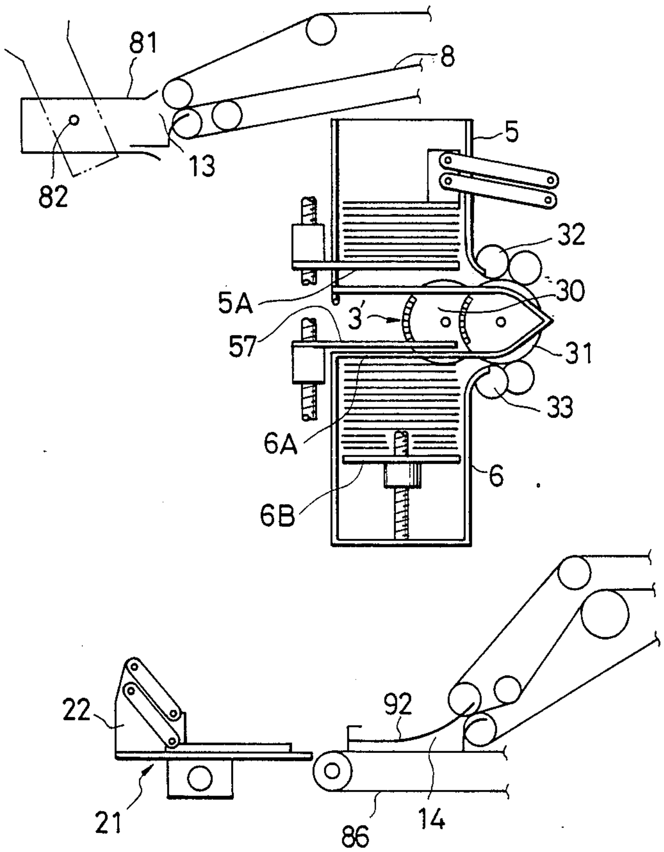
FIGS. 13 and 14 are views each showing operations of the payment transaction in this embodiment.

These currencies are accumulated in the second accumulation unit 5. In the case of transferring the thousand yen notes from the cash box 36 to the third accumulation unit 6 where the currencies are accumulated, the same operations may be effected. In consequence, the ten thousand yen notes are accumulated in the second accumulation unit 5, while the thousand yen notes are accumulated in the third accumulation unit 6, whereby the payment can be made. When there is a request for the payment transaction, the partition plate 57, as illustrated in FIG. 13, retreats in a position a little bit higher than the upper plate 6A of the third accumulation unit 6, and the thousand yen notes in the third accumulation unit 6 are brought into press-contact with the feed-out roller 30. Then rotate the feed-out roller 30 and the sending roller 30 in the anticlockwise direction. Immediately, the thousand yen notes in the third accumulation unit 6 are fed out by dint of the action of the friction rollers disposed on the circumferential surfaces thereof and are sequentially separated by the frictional force of the separating roller 33. The individually separated currencies pass through the identifying unit 7 and are led via the carrying passage 8 to the fourth accumulation unit 13 through the intermediary of the change-over gate 11. These paper currencies are accumulated in this unit 13. The destination of the paper currencies which are in the abnormal separating conditions like the overlap-transfer is changed over by the change-over gates 11, 12, 84, and the currencies are led to, for instance, the sixth accumulation unit 15, in which place they are accumulated. After a given number of the thousand yen notes have been fed out, the bottom plate 6A of the third accumulation unit 6 is lowered, and the currencies are kept in such a position that they do not come in contact with the feed-out roller 30. The partition plate 57 descends below the outer peripheral surface of the feed-out roller 30 in order that the thousand yen notes accumulated in the third accumulation unit 6 are by no means in contact with the feed-out roller 30.

Figure 14:
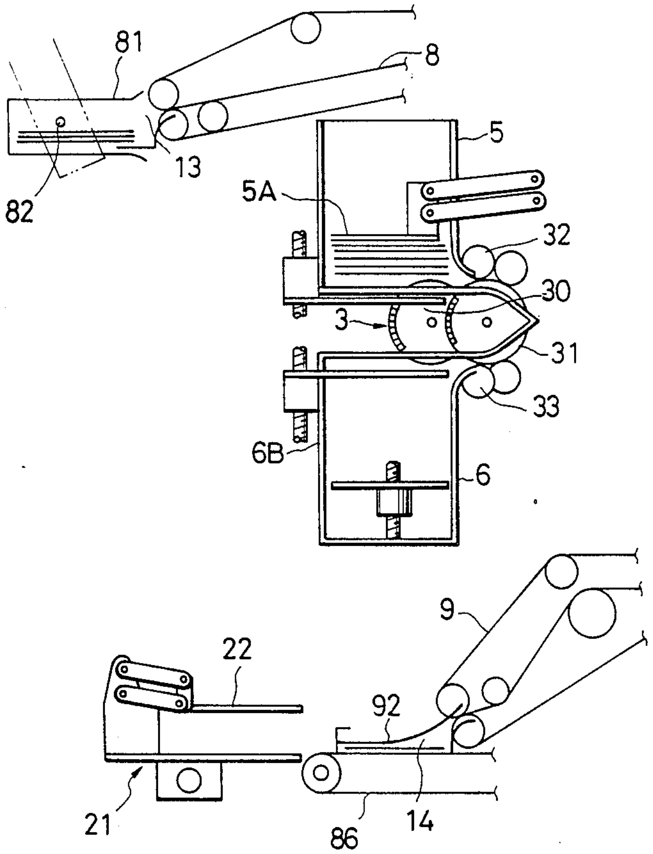

After this process, the bottom plate 5A of the second accumulation unit 5 is, as shown in FIG. 14, lowered below the bottom plate 4A of the first accumulation unit 4, whereby the ten thousand yen notes are brought into contact with the feed-out roller 30. Thereafter, when the feedout roller 30 and the sending roller 31 rotate clockwise, the ten thousand yen notes are separated piece by piece and are carried via the identifying unit 7 to be accumulated in the fourth accumulation unit 13. When the paper currencies which meet the request of the customer with respect to the monetary classification, the number of currencies according to this classification and the amount of money are accumulated in the fourth accumulation unit 13, the guide makes a turn such as to stand vis-á-vis with the money receiving-/paying port 2. Then opens this port 2, and the customer receives the payment currencies therefrom. While on the other hand, the moving belt 86 and the transferring means 21 are driven so as to closely face each other. The hand member 22 opens and then enters the sixth accumulation unit 15. The currencies rejected at the sixth accumulation unit 15 are grasped by the hand member 22 and are enclosed in the reject box 19.

Generally speaking, where the separating unit 3 is possessed of high separating efficiency, the paper currencies are rejected, so that no currency is accumulated in the sixth accumulation unit 15. As a result, once the paper currencies are handed over to the customer, the hand member 22 can be kept in such a state as to stand by the deposit transaction.

In the above-described embodiments, the first, second and third accumulation units are respectively disposed in the upper and lower positions in such a way that the paper currencies are horizontally placed, and the paper currency separating mechanism is provided between these accumulation units. The paper currencies may, however, be vertically placed.

As explained earlier, according to the embodiments of the present invention, a plurality of the paper currencies are carried en bloc by the hand member, and the unidentifiable or abnormal currencies among the deposit paper currencies are returned directly to the money receiving/paying port. Hence, the mechanisms for individually transferring the currencies can be reduced in number. In addition, it is possible to prevent an accident at the time of transferring the currencies. By virtue of this arrangement, the device can be reduced both in size and in cost, and further the reliability on the device can be improved. Moreover, inasmuch as the payment currencies are transferred via the carrying passage directly to the money receiving/paying port so as to be accumulated therein, the number of operations of the hand member decreases, thereby considerably diminishing the time required for the transactions. Consequently, the time for which the customers have to wait can be reduced, and concomitantly the serviceability is improved. There increases the number of transactions with which the device is capable of dealing per diem. Hence, it is feasible to outstandingly enhance both the banking efficiency and the operational efficiency.

What is claimed is:

1. A transacting device adapted for use as a circular type cash dealing device in which deposit currencies are utilized as payment currencies, which comprises:

a first accumulation unit for receiving and accumulating the deposit currencies;

a second accumulation unit, disposed in such a way that said second accumulation unit is enterable in said first accumulation unit, for accumulating first payment currencies;

a third accumulation unit, disposed in the vicinity of said second accumulation unit, for accumulating second payment currencies;

a separating unit, provided in the proximity of said accumulation units, for separating and selectively transferring the paper currencies accumulated in each of said accumulation units;

an identifying unit for identifying the separated and transferred currencies with respect to authenticity, monetary classification and the number of currencies;

an accumulation unit for accumulating the paper currencies which have undergone the identifying process by dividing the currencies into at least payment currencies and non-payment currencies;

an accumulation unit for accumulating unidentifiable currencies and the payment currencies;

carrying means for carrying the paper currencies from said identifying unit to said selected accumulation unit on the basis of the identifying results of the paper currencies which are given by said identifying unit;

an enclosing unit for enclosing the deposit and payment currencies; and paper currency transferring means for transferring the paper currencies en bloc between said accumulation units, said enclosing unit and money receiving/paying port.

2. A transacting device as set forth in claim 1, wherein said separating unit includes feed-out and sending rollers each having a friction member.

3. A transacting device as set forth in claim 1, wherein said separating unit includes feed-out and sending rollers each having a vacuum adsorbing member.

4. A transacting device as set forth in claim 3, wherein said feed-out roller and said sending roller of said separating unit respectively rotate in the directions opposite to each other both at the time of separation of the paper currencies in said first and second accumulation units and at the time of separation of the paper currencies in said third accumulation unit.

5. A transacting device as set forth in claim 1, wherein said second accumulation unit is disposed above said first accumulation unit, and at the time of paying the paper currencies said second accumulation unit is arranged to move in order to enter said first accumulation unit and closely stand vis-á-vis with said separating unit with the aid of a moving mechanism.

6. A transacting device as set forth in claim 1, wherein said third accumulation unit is disposed below said separating unit and is equipped with a partition member for pushing down the paper currencies accumulated therein.

7. A transacting device as set forth in claim 1, wherein said paper currency transferring means includes a hand member for seizing and transferring en bloc the paper currencies accumulated in said accumulation units, said enclosing unit and said money receiving/paying port.

8. A transacting device adapted for use as a circular type cash dealing device in which deposit currencies are utilized as payment currencies, which comprises:

- a first accumulation unit for receiving and accumulating the deposit currencies;
- a second accumulation unit, disposed in such a way that said second accumulation unit is enterable in said first accumulation unit, for accumulating payment currencies;
- a separating unit, disposed in the vicinity of said first accumulation unit, for separating and selectively transferring the paper currencies accumulated in said first accumulation unit or said second accumulation unit;
- an identifying unit for identifying the separately transferred currencies with respect to authenticity, monetary classification and the number of currencies;
- an accumulation unit for accumulating the paper currencies which have undergone the identifying process by dividing the currencies into at least payment currencies and non-payment currencies;
- an accumulation unit for accumulating unidentifiable currencies and the payment currencies;
- carrying means for carrying the paper currencies from said identifying unit to said selected accumulation unit on the basis of the identifying results of the paper currencies which are given by said identifying unit;
- an enclosing unit for enclosing the deposit and payment currencies; and
- paper currency transferring means for transferring the paper currencies en bloc between said accumulation units, said enclosing unit and a money receiving/paying port.

9. A transacting device as set forth in claim 8, wherein said separating unit includes feed-out and sending rollers each having a friction member.

10. A transacting device as set forth in claim 8, wherein said separating unit includes feed-out and sending rollers each having a vacuum adsorbing member.

11. A transacting device as set forth in claim 8, wherein said second accumulation unit is disposed above said first accumulation unit, and at the time of paying the paper currencies said second accumulation unit is arranged to move in order to enter said first accumulation unit and to closely stand vis-á-vis with said separating unit with the add of a moving mechanism.

12. A transacting device as set forth in claim 8, wherein said paper currency transferring means has a hand member for seizing and transferring en bloc the paper currencies accumulated in said accumulation units, said enclosing unit and said money receiving/paying port.

13. A transacting device adapted for use as a circular type cash dealing device in which deposit currencies are utilized as payment currencies, which comprises:

- a first accumulation unit for receiving and accumulating the deposit currencies;
- a second accumulation unit, disposed in such a way that said second accumulation unit is enterable in said first accumulation unit, for accumulating first payment currencies;
- a separating unit, disposed in the vicinity of said first accumulation unit, for separating and selectively transferring the paper currencies accumulated in said first accumulation unit or said second accumulation unit;
- an identifying unit for identifying the separately transferred paper currencies with respect to authenticity, monetary classification and the number of currencies;
- an accumulation unit for accumulating the paper currencies which have undergone the identifying process by dividing the currencies into at least payment currencies and non-payment currencies;
- an accumulation unit, standing vis-á-vis with said money receiving/paying port, for accumulating unidentifiable currencies and the payment currencies;
- carrying means for carrying the paper currencies from said identifying unit to said selected accumulation unit on the basis of the identifying results of the paper currencies which are given by said identifying unit;
- an enclosing unit for enclosing the deposit and payment currencies according to at least the monetary classification; and
- paper currency transferring means for transferring the paper currencies en bloc between said money receiving/paying port and said first accumulation unit, between said second accumulation unit and said enclosing unit, and between said accumulation unit for the payment currencies, said accumulation unit for the non-payment currencies and said enclosing unit.

14. A transacting device as set forth in claim 13, wherein said separating unit includes feed-out and sending rollers each having a friction member.

15. A transacting device as set forth in claim 13, wherein said separating unit includes feed-out and sending rollers each having a vacuum adsorbing member.

16. A transacting device as set forth in claim 13, wherein said second accumulation unit is disposed above said first accumulation unit, and at the time of paying the paper currencies said second accumulation unit is arranged to move in order to enter said first accumulation unit and to closely stand vis-á-vis with said separating unit with the aid of a moving mechanism.

17. A transacting device as set forth in claim 13, wherein said paper currency transferring means is equipped with a hand member for seizing and transferring en block the paper currencies of said accumulation units, said enclosing unit and said money receiving/paying port.

18. A transacting device as set forth in claim 13, wherein said accumulation units for the payment and non-payment currencies are disposed on movable moving means, and said accumulation units are so arranged as to be positioned opposite to said paper currency transferring means as occasion arises.

19. A transacting device adapted for use as a cash dealing device in which deposit currencies are enclosed in cash enclosing units according to monetary classification, which comprises:

a first accumulation unit for receiving and accumulating the deposit currencies;

a separating unit, provided in the proximity of said first accumulation unit, for separating and transferring the paper currencies accumulated in said first accumulation unit;

an identifying unit for identifying the separately transferred paper currencies with respect to authenticity, monetary classification and the number of currencies;

a plurality of accumulation units for accumulating the identified currencies according to the monetary classification;

carrying means for carrying the paper currencies from said identifying unit to said selected accumulation unit on the basis of the identifying results of the paper currencies which are given by said identifying unit;

an enclosing unit for enclosing the deposit currencies according to the monetary classification; and paper currency transferring means for transferring the paper currencies en bloc from said deposit currency receiving port to said first accumulation unit and from a plurality of said accumulation units for accumulating the paper currencies according to the monetary classification to said deposit currency enclosing unit.

20. A transacting device adapted for use as a cash dealing device in which paper currencies whose species and number are specified are sent from an enclosing unit for enclosing the paper currencies according to monetary classification to an money paying port, which comprises:

at least a single accumulation unit for accumulating the payment currencies according to the monetary classification;

a separating unit, provided close to said accumulation unit for accumulating the paper currencies according to the monetary classification, for separating and transferring the paper currencies accumulated in said accumulation unit;

an identifying unit for identifying the separately transferred paper currencies with respect to authenticity, monetary classification and the number of currencies;

an accumulation unit for accumulating the payment currencies which have undergone the identifying process;

carrying means for carrying the identified currencies to said payment currency accumulation unit; and paper currency transferring means for transferring the paper currencies en bloc from at least said paper currency enclosing unit to said accumulation unit for accumulating the payment currencies according to the monetary classification.

21. A paper separating device for separating and selectively transferring sheets of paper accumulated in a plurality of accumulation units, which comprises:

a first accumulation unit for accumulating a first kind of papers;

a second accumulation unit, disposed in such a way that said second accumulation unit is enterable in said first accumulation unit, for accumulating a second kind of papers; and a separating unit, disposed in the vicinity of said first accumulation unit, for separating and selectively transferring sheets of paper accumulated in said first and second accumulation units, said separating unit including feeding means for feeding out sheets of paper accumulated in any one of said two accumulation units; sending means for sending out the thus fed papers; separating means, disposed in such a manner that said separating means is in contact with said sending means, for preventing overlap-transfer of the papers; and carrying means for carrying the thus separated papers.

22. A paper separating device as set forth in claim 21, wherein said second accumulation unit for accumulating the second kind of papers is equipped with a bottom plate which is moved by a moving mechanism, and said bottom plate is arranged to intrude into said first accumulation unit when the first kind of papers are not accumulated in said first accumulation unit.

23. A paper separating device for separating and selectively transferring sheets of paper accumulated in a plurality of accumulation units, which comprises:

a first accumulation unit for accumulating a first kind of papers;

a second accumulation unit, disposed in such a way that said second accumulation unit is enterable in said first accumulation unit, for accumulating a second kind of papers;

a third accumulation unit, disposed in the proximity of said first accumulation unit, for accumulating a third kind of papers; and a separating unit, disposed in the vicinity of said first and third accumulation units, for separating and selectively transferring the papers accumulated in said first, second and third accumulation units, said separating unit including feeding means for feeding out the papers accumulated in any one of said three accumulation units; sending means for sending out the thus fed papers; separating means, disposed opposite to said sending means, for preventing overlap-transfer of the papers; and carrying means for carrying the separated papers.

24. A paper separating device as set forth in claim 23, wherein said first accumulation unit is provided above said separating unit, while said third accumulation unit is provided below said separating unit.

25. A paper separating device as set forth in claim 24, wherein said second accumulation unit for accumulating the second kind of papers is equipped with a bottom plate which is moved by a moving mechanism, and said bottom plate is arranged to intrude into said first accumulation unit when the first kind of papers are not accumulated in said first accumulation unit.

26. A paper separating device as set forth in claim 24, wherein said third accumulation unit for the third kind of papers includes a partition plate, moved by a moving mechanism, for causing the third kind of papers to come in contact with said separating unit or to be spaced away therefrom.

27. A paper separating device as set forth in claim 24, wherein said feeding means and said sending means of said separating unit rotate clockwise when separating and transferring the papers accumulated in said first and second accumulation units but rotate anticlockwise when separating and transferring the papers accumulated in said third accumulation unit.

* * * * *